INVENTOR.
CARLISLE M. STICKLEY

INVENTOR.
CARLISLE M. STICKLEY
ATTORNEYS

United States Patent Office 3,327,243
Patented June 20, 1967

3,327,243
LASER TUNING AND MODULATING SYSTEM
HAVING AN EXTERNAL FEEDBACK PATH
Carlisle M. Stickley, 53 Stone Road,
Sudbury, Mass. 01776
Filed June 3, 1963, Ser. No. 285,159
2 Claims. (Cl. 331—94.5)

The invention described herein may be manufactured and used by or for the United States Government for governmental purposes without payment to me of any royalty thereon.

The invention relates to lasers, and more particularly to a laser wherein the frequency of the coherent signal may be controlled over a pre-selected range and wherein the coherent signal may also be modulated.

The prior art has provided lasers to permit light amplification by stimulated emission of radiation. Laser operation required an active material that will produce stimulated emission of radiation (lase), an excitation source that pumps power into the active material, and a resonance structure. The active material, in one instance, is a ruby; the excitation source a xenon flashtube; and the resonant structure is formed by a ruby rod, whose ends are reflecting mirrors. One end of the rod has a heavy silver coat that makes it an opaque mirror and the other end has a silver coat that makes it a 92 percent reflecting mirror. The laser provides a coherent light output in much the same sense an R.F. oscillator exhibits definite time and phase relations in its output waveform. The output from the conventional laser is a beam of highly parallel light rays which permits travel over extreme distances with little divergence.

In the prior art, the ends of a ruby rod are coated with silver and act as a mirror and these two mirrored ends form a cavity that has well defined resonances. However, in the present invention the ends of a ruby rod are coated with antireflection layers and means are provided to direct the signal output from the rod around a loop. Interposed in the loop are means including a Fabry-Pérot etalon which controls the frequency over preselected range. There is also provided additional means associated with the etalon which modulates the signal in the aforementioned loop.

The present invention, thus, provides a method and means wherein elements external to the ruby rod are utilized to determine the frequency characteristics of the laser and also simultaneously modulate the output signal therefrom.

An object of the present invention is to provide method and apparatus to tune a laser over a preselected range.

Another object of the present invention is to provide method and apparatus to modulate the signal within a laser.

Still another object of the present invention is to provide method and apparatus to simultaneously control the frequency and also modulate the coherent light signal within a laser.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
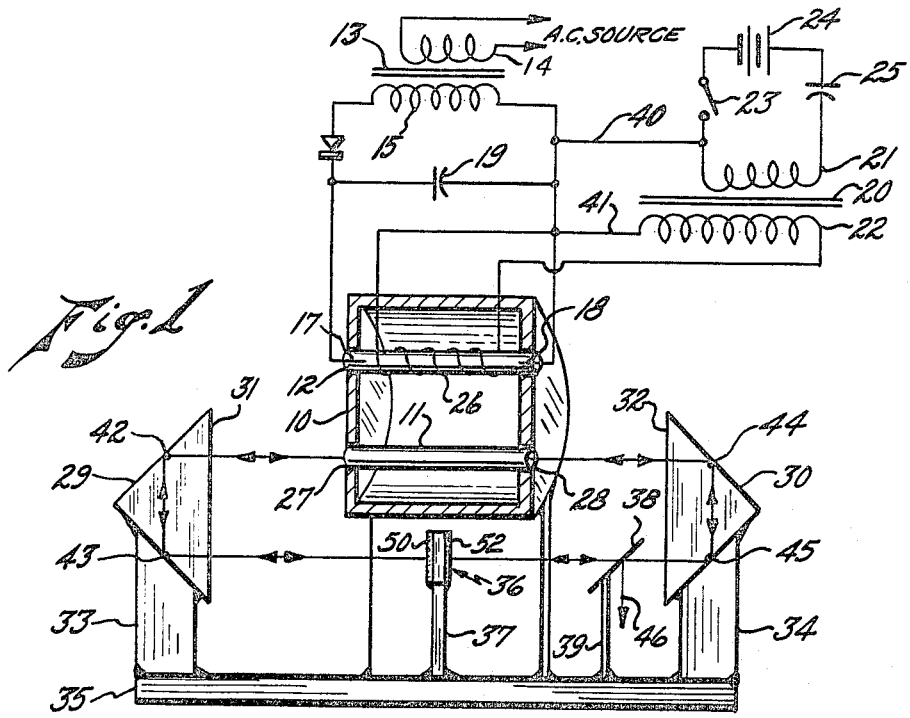
FIGURE 1 is a view partly in section and partly schematic of one embodiment of the present invention.

Now referring in detail to FIGURE 1, there is shown elliptical cylinder reflector 10, the inner surface thereof being highly polished. Ruby rod 11 is doped with chromium and is pressure fitted into cylinder 10, xenon flashtube 12 is also pressure fitted into cylinder 10. Ruby rod 11 and pumping source, flashtube 10, are mounted at the foci of the polished cavity, cylinder 10, which has an elliptical cross section thereby causing all the flashtube's light to hit the ruby rod.

There is provided transformer 13 having primary winding 14 and secondary winding 15. Primary winding is connected to an alternating current source. One leg of secondary winding 15 is connected to electrode 17 of flashtube 12 by way of diode 16 and the other leg is connected to electrode 18. Capacitor 19 is connected across electrodes 17 and 18. There is also provided step-up transformer 20 having primary winding 21 and secondary winding 22. The two legs of primary winding 21 are interconnected by switch 23, battery 24 and capacitor 25. Primary winding 21 is also connected to secondary winding 15 by way of line 40. Inductance 26 is wound around the outer surface of flashtube 12 and is connected across secondary winding 22. Secondary winding 22 is also connected to secondary winding 15 by way of line 41. The above-described apparatus and interconnections thereof are conventional in the laser prior art as shown and described in, Electronics, Oct. 27, 1961, at pages 39–47 with the exception of ruby rod 11 which heretofore have treated ends 27 and 28 with silver coatings to act as mirrors and these two mirrored ends formed a cavity with well-defined resonant frequencies. However, in the present invention, 27 and 28, respectively, are coated with antireflection layers such as magnesium fluoride.

Hereinafter to be described is the apparatus for establishing an external loop for the coherent light emanating from ruby rod 11, it is comprised of prism 29 mounted on a suitable support 33 which in turn is affixed to platform 35. Prism 30 is mounted on any suitable support 34 and is also affixed to platform 35. There is also shown Fabry-Pérot etalon 36 mounted on support 37 which is affixed to platform 35. Paritally silvered mirror 38 is mounted on support 39 which in turn is affixed to platform 35.

Prisms 29 and 30 are identical and may be of the type shown and described at pages 45–46 and Figure 2–21 of "Optics" Sears, 3rd edition, published in 1949 by Addison-Wesley Press, Inc. Prisms 29 and 30 are of the 45°-45°-90° "Porro" type wherein light enters and leaves at right angles to the hypotenuse and is reflected at each of the shorter faces. In place of prisms 29 and 30, there may be substituted a system of mirrors for each prism to obtain the identical mode of operation.

Fabry-Pérot etalon is conventional and may be such as shown and described at pages 269–275 and Figure 14N of "Fundamentals of Optics" by Jenkins and White published in 1950 by McGraw-Hill Books Company, Inc. Etalon 36 is more specifically shown in FIGURE 2 where plates 50 and 52 have interposed therebetween quartz spacer 51. A pair of Fabry-Pérot plates mounted rigidly with a spacer therebetween is called an etalon. It is apparent that the separation of plates 50 and 52 may be controlled by varying the thickness of spacer 51. It is also possible to utilize a piezoelectric crystal for spacer 51.

Now referring again to FIGURE 1, outer surfaces of ends 27 and 28 of ruby rod 11 face and are parallel to outer surfaces 31 and 32 of prisms 29 and 30, respectively. Surfaces 31 and 32 are also coated with antireflection layers such as magnesium fluoride. The outer surface of plates 50 and 52 of etalon 36 also face and are parallel to out surfaces 31 and 32 of prisms 29 and 30, respectively. Partially-silvered mirror 38 is placed at a predetermined angle and is positioned between etalon 36 and prism 30.

Partially-silvered mirror 38 is conventional in its utilization as a beam splitter and may be such as shown and described at page 257 of the third edition of "Optics" by Sears, published in 1949 by Addison-Wesley Press, Inc.

In the operation of the apparatus shown in FIGURE 1, switch 23 is closed and as a result thereof flashtube 12 is energized thereby concentrating the light therefrom upon ruby rod 11 thereby stimulating emission of radiation therefrom. This mode of operation is conventional and is such as described in the aforementioned cited Oct. 27, 1961, issue of Electronics. It is to be noted that ruby rod 11 serves as the active material in this embodiment but any laser rod or gas laser may be utilized. In addition thereto the excitation source, flashtube 12, may have substituted therefor any other suitable source of a similar nature. Etalon 36 can be made of any material that is transparent to the emission wavelength of the laser material being used.

When ruby rod 11 is stimulated to emission, coherent light is transmitted out from ends 27 and 28 simultaneously. The path of travel from end 27 is to prism 29, point 42, to point 43 through etalon 36 and partially-silvered mirror 38 to prism 30, point 45, to point 44 and to rod 28. The path of travel of the coherent light emitted from end 28 is to prism 30, point 44, to point 45, through mirror 38 and etalon 36 to prism 29, point 43, to point 42 and then to end 27. It is clear that there is thus provided an external loop of coherent light. Partially-silvered mirror 38 also serves as a beam splitter and a portion of the coherent light is diverted to path 46 which then serves as the output. If Fabry-Pérot etalon 36 were not in the feedback path (external loop), the inherent frequency selection mechanisms are not strong. Since Fabry-Pérot etalon 36 has well defined resonances, then with etalon 36 in the coherent light loop, the laser oscillates at frequencies prescribed by the characteristics thereof. In particular, when etalon 36 is small in its optical length, the laser oscillates at only one frequency, i.e. where $n'd$ (where $n'$ is the refractive index of external Fabry-Pérot etalon and $d$ is the separation between its plates) is sufficiently small, the separation between adjacent cavity resonances of the external Fabry-Pérot etalon can be large, compared to the width of the fluorescent line and it will oscillate at but one resonant frequency. This is, then, also a method in which the separation between resonances is controlled by an external element and not the length of laser rod.

Thus the present invention provides method and apparatus for controlling the frequency of a laser by stimulating an active material to emit coherent light, then controlling the coherent light to achieve an external loop thereof and interposing in the loop an element such as a Fabry-Pérot etalon to control the resonant frequency. Also interposed in the loop are beam-splitting means to provide an output therefrom. The etalon element interposed in the loop appears to operate as a selective filter and thereby ensure operation at only one preselected frequency. Thus if a change in operational frequency is desired then the distance between the plates of the etalon may be changed by inserting a spacer having another thickness.

Figure 2:
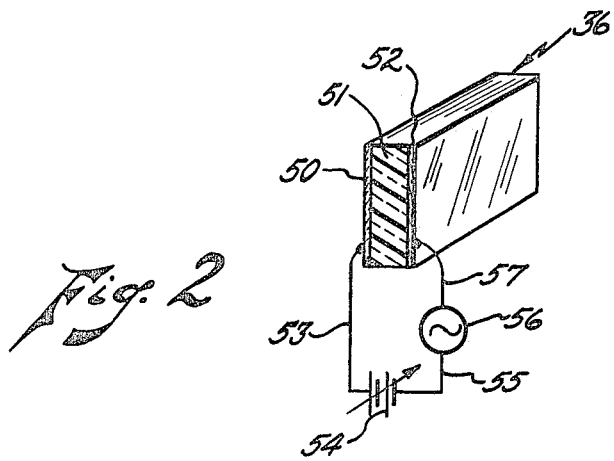
FIGURE 2 shows additional control circuitry for FIGURE 1.

Now referring to FIGURE 2, there is shown Fabry-Pérot etalon 36 having plates 50 and 52 separated by quartz spacer 51. Plates 50 and 51 are electrically interconnected by way of line 53, variable battery 54, line 55, A.C. generator 56 and line 57. This structure when incorporated into FIGURE 1 in place of etalon 36 operates in the same fashion with the exception that quartz crystal 51 has applied thereto a D.C. voltage by way of battery 54. There is thus provided a piezoelectric effect where a mechanical strain is produced on quartz crystal 51 as it is placed in an electric field thereby varying the thickness thereof. As hereinbefore described, the characteristics of etalon 36 is dependant on $n'd$ and this is presently controlled by an externally applied potential as from battery 54. Since $k\lambda = 2n'd$ (where $k$=an integer, $\lambda$=a resonant wavelength) and $n'd$ is a function of applied potential, then $\lambda$ is a function of the magnitude of applied potential. Hence the laser of the present invention is tunable over a range $\Delta\lambda = \lambda^2_0/2n'd$ by means of varying battery 54. In addition thereto, A.C. signal generator 56 is in series with D.C. battery 54, consequently $n'd$ of etalon 36 will change at the frequency of the signal generator and will yield a frequency modulated beam. The amount of frequency swing of the laser beam is governed by the relationship between the magnitude of the field applied to etalon 36 and its optical length, $n'd$. Either the piezoelectric effect or electrooptic effect could be employed to achieve the desired relationship of $n'd$ depending on an external potential. It is to be noted that A.C. signal generator 56 might be a microphone receiving speech so that a frequency modulated light beam output is then available which is representative of speech.

Figure 3:
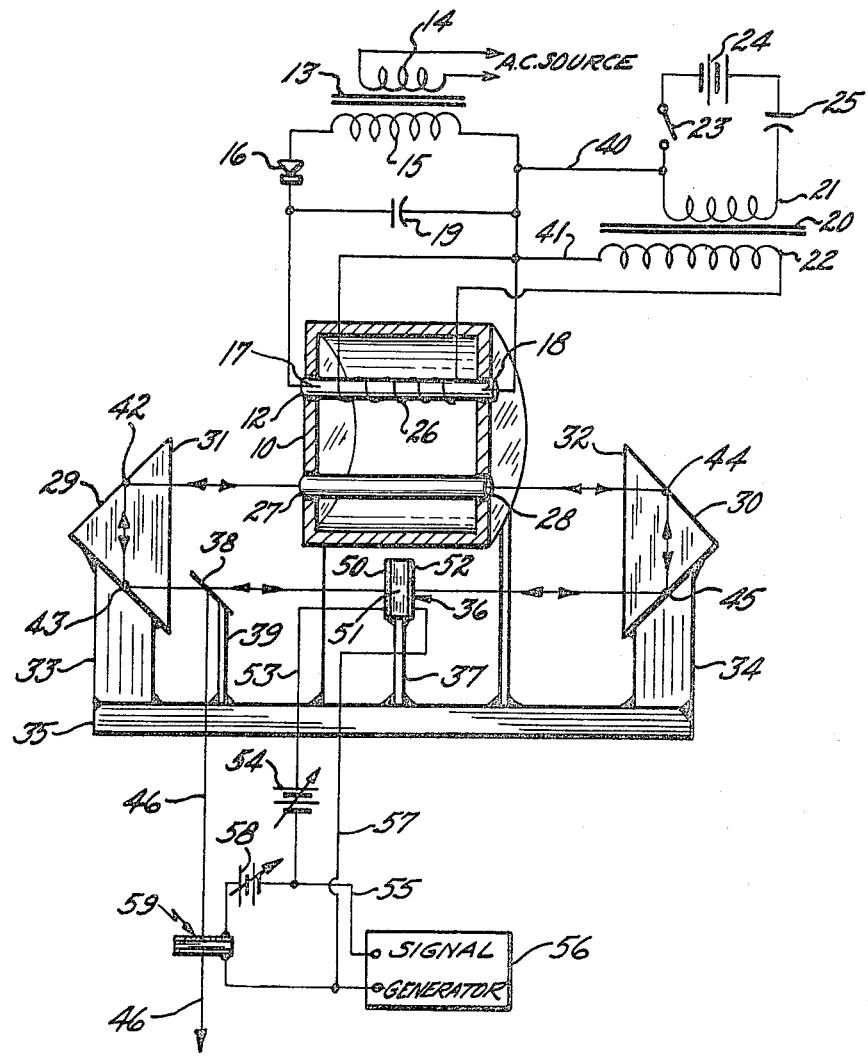
FIGURE 3 shows a second embodiment of the present invention.

Now referring to FIGURE 3, there is shown the circuitry of FIGURES 1 and 2 but also includes additional circuitry consisting of Fabry-Pérot etalon 59 and variable D.C. battery 58. In order to increase the rate at which the frequency can be modulated, etalon 59 is inserted in output beam path 46. If it is not identical to etalon 36, it is tuned by varying battery 58 to make them identical. If etalon 59 were not utilized, the modulation rate would be somewhat slower. When inserted in output beam 46, it acts as a tuned filter for the desired output radiation. Hence, the modulation rate can be increased to almost the reciprocal of the transit time in the system.

Thus the present invention provides a method and system in which the frequency of the laser is determined by an external element such as a Fabry-Pérot etalon rather than the laser rod itself. Therefore, it is tunable over a given range. Since the optical length of the Fabry-Pérot etalon can be controlled by an external source, the frequency modulation is also provided. The modulation swing is determined by the strength of the external source and the rate is the same as the frequency of the source. The utilization of etalon 59 allows an increase in the modulation rate to a point where it is determined by the transit time of a wavefront around the loop.

The present invention also permits a combination of polarization and amplitude modulation by inserting for Fabry-Pérot etalon 36 a material which serves as a polarizer that rotates the plane of polarization of a wave passing through it upon application of an external field. In the case of a zero degree ruby rod, pure polarization modulation is possible: for any other orientation the amplified output would be less since the crystal breaks up the polarized wave into two components, one of which receives gain and the other is attenuated.

What is claimed is:

1. A system for modulating and tuning a laser comprising a resonant cavity, an active laser material capable of producing stimulated emission in the form of a laser beam, said laser material being positioned in said cavity, said active laser material further having first and second end surfaces coated with antireflection layers to permit said laser beam to emerge therefrom and also enter therein, means for supplying excitation energy to said active laser material to stimulate emission of said radiation in the form of said laser beam, first optical means associated with and part of said cavity receiving said laser beam from said first end and directing said laser beam in a first path external to said laser material to second optical means also being associated with and part of said cavity, said second optical means directing said laser beam to said second end, said second optical means simultaneously receiving a laser beam output from said second end and directing said laser beam output in a second path external to said laser material to said first optical means for further transmission to said first end, said first and second paths being along coincidental lines, a Fabry-Pérot etalon with a preselected frequency range interposed in said external beam paths and said Fabry-Pérot etalon permitting the passage therethrough of said laser beams and operating to restrict the resonance of said active laser material to said preselected frequency range of said etalon, said Fabry-Pérot etalon including a pair of plates separated by a quartz spacer, means to apply a direct current voltage across said plates for application to said quartz crystal to provide a piezoelectric effect, the magnitude of said direct current voltage being variable thus providing a variation of frequency of said Fabry-Pérot etalon over said preselected frequency range, modulating means in series with said direct voltage applying means, and a beam splitter also interposed in said external paths to direct a portion of said laser beams from said external paths to provide a modulated laser beam output.

2. A system for modulating and tuning a laser comprising a resonant cavity, an active laser material capable of producing stimulated emission in the form of a laser beam, said laser material being positioned in said cavity, said active laser material further having first and second end surfaces coated with antireflection layers to permit said laser beam to emerge therefrom and also enter therein, means for supplying excitation energy to said active laser material to stimulate emission of said radiation in the form of said laser beam, first optical means associated with and part of said cavity receiving said laser beam from said first end and directing said laser beam in a first path external to said laser material to second optical means also being associated with and part of said cavity, said second optical means directing said laser beam to said second end, said second optical means simultaneously receiving a laser beam output from said second end and directing said laser beam output in a second path external to said laser material to said first optical means for further transmission to said first end, said first and second paths being along coincidental lines, a first Fabry-Pérot etalon with a preselected frequency range interposed in said external beam paths and said Fabry-Pérot etalon permitting the passage therethrough of said laser beams and operating to restrict the resonance of said active laser material to said preselected frequency range of said etalon, said first Fabry-Pérot etalon including a pair of plates separated by a quartz spacer, first means to apply a direct current voltage across said plates for application to said quartz crystal to provide a piezoelectric effect, the magnitude of said direct current voltage being variable thus providing a variation of frequency of said first Fabry-Pérot etalon over said preselected frequency range, modulating means in series with said first direct voltage applying means, a beam splitter also interposed in said external paths to direct a portion of said laser beams to a second Fabry-Pérot etalon, said second Fabry-Pérot etalon being identical to said first Fabry-Pérot etalon, and second means to provide a variable direct current voltage across said second Fabry-Pérot etalon to permit tuning of said second Fabry-Pérot etalon to the same frequency as said first Fabry-Pérot etalon, said second Fabry-Pérot etalon providing a laser beam output.

References Cited

UNITED STATES PATENTS

| 3,229,223 | 1/1966 | Miller | 331—94.5 |
| 3,243,722 | 3/1966 | Billings | 331—94.5 |

FOREIGN PATENTS

| 1,323,829 | 3/1963 | France. |
| 342,219 | 1/1931 | Great Britain. |

OTHER REFERENCES

Siegman, "Nonlinear Optical Effects: An Optical Power Limiter" Applied Optics, vol. 1, Nov. 1962, pp. 739–744.

JEWELL H. PEDERSEN, *Primary Examiner.*

RONALD L. WILBERT, *Examiner.*